United States Patent [19]
Moriguchi et al.

[11] Patent Number: 5,306,894
[45] Date of Patent: Apr. 26, 1994

[54] CONSUMABLE ELECTRODE TYPE D.C. ARC WELDER

[75] Inventors: Haruo Moriguchi, Itami; Tetsurou Ikeda, Osaka; Kenzo Danjo, Kizu; Toshikazu Fujiyoshi, Kawanishi; Masahiro Aoyama, Higashi-osaka; Kunio Karino, Suita, all of Japan

[73] Assignee: Sansha Electric Manufacturing Company, Ltd., Osaka, Japan

[21] Appl. No.: 25,775

[22] Filed: Mar. 3, 1993

[30] Foreign Application Priority Data

Mar. 3, 1992 [JP] Japan .................. 4-82675

[51] Int. Cl.$^5$ .............................. B23K 9/10
[52] U.S. Cl. .............................. 219/130.31
[58] Field of Search .......... 219/130.21, 130.31, 219/137 PS

[56] References Cited

FOREIGN PATENT DOCUMENTS 57-62864  4/1982  Japan ............. 219/130.21
61-216859 3/1985  Japan .

Primary Examiner—Clifford C. Shaw
Attorney, Agent, or Firm—Wegner, Cantor, Mueller & Player

[57] ABSTRACT

An invertor controlled D.C. arc welder of consumable electrode type which is arranged to rectify an a.c. power from a commercial power supply, convert it into a high frequency a.c. power by an invertor, rectify it again to obtain a d.c. power output for welding and stabilize the output voltage by feedback control of the invertor based upon the output voltage and provided with means for discriminating shorting and arcing periods of its welding load from the output voltage and additionally controlling the invertor based upon a resultant discrimination signal to raise the output voltage during the early time of the arcing period, thereby preventing defective welding due to insufficient output current. This invention is especially, effective for supplementing such insufficient output current as an aftereffect of insufficient output power during the shortening period in such welder which is provided with means for reducing the output voltage during the shortening period to prevent generation of undesirable spattering.

3 Claims, 3 Drawing Sheets 5,306,894

CONSUMABLE ELECTRODE TYPE D.C. ARC WELDER

BACKGROUND OF THE INVENTION

This invention relates to a consumable electrode type d.c. arc welder and, especially, to an invertor controlled d.c. arc welder of consumable electrode type.

The invertor controlled d.c. arc welder is arranged to rectify an a.c. power from a commercial power supply by an input rectifier, convert its d.c. output into a high frequency a.c. power by an invertor composed of semiconductor switching elements, suitably reduce its voltage by an output transformer and again rectify it to obtain a d.c. power for welding. The welder of this type has such an advantage in that the device can be made small in size and weight since it needs no input transformer of large weight and the output transformer can be made small by increasing the output frequency of the invertor and, moreover, its output voltage can be effectively stabilized by controlling switching operation of the invertor using a difference between the output voltage and a predetermined reference voltage as its control voltage.

While d.c. arc welding of consumable electrode type, such as $CO_2$ welding, MAG welding and MIG welding, is effected by supplying a stabilized d.c. power as above-mentioned from a welder to a welding load formed of a continuously fed welding electrode rod and a base material to be welded, separating the electrode rod shorted with the base material from the base material to form an arc therebetween and, thereafter, repeating shorting and arcing in similar fashion, undesirable spattering may take place if a current supplied to the welding load becomes excessive at the time of shorting. In order to avoid such spattering, it has been a general practice to provide a large d.c. reactor in the output side of the welder to prevent sudden increase of the load current. However, it has been a bar to reduction of the size and weight of the welder.

The inventors proposed means for preventing such undesirable spattering in the prior Japanese patent application No. H3-353356 (and its corresponding U.S. application Ser. No. 07/991,436, filed Dec. 16, 1992 now U.S. Pat. No. 5,272,314. More particularly, the shorting period Ts is detected from the output voltage V of the welder, which varies as shown in FIG. 1(a) and the above-mentioned reference voltage Sr is reduced by a predetermined value Sn during this period as shown in FIG. 1(b). Then, the above-mentioned invertor control voltage rises to reduce the output voltage during this period, thereby reducing the output current as shown in FIG. 1(c) to suppress spattering. However, it has been found that recovery of the output current is delayed at the early time of the arcing period as an aftereffect of reduction of the output current during the shorting period and less heat is supplied to the welding load. Thus, as shown in FIG. 2, a welded portion A rises abruptly from a base material B and, therefore, the welded region is narrowed to produce an insufficient weld having reduced mechanical strength.

Accordingly, an object of this invention is to provide an improved consumable electrode type d.c. arc welder which produces no defective weld as above-mentioned.

SUMMARY OF THE INVENTION

According to this invention, the above-mentioned invertor controlled d.c. arc welder of consumable electrode type, which includes means for detecting the difference between the output voltage and the predetermined reference voltage and cotrolling the invertor based upon this difference to stabilize its average output voltage, is provided with means for detecting the arcing period from the output voltage and raising the reference voltage by a predetermined value at least during the early time of the arcing period. Thus, the above-mentioned difference and, accordingly, the output voltage are increased and, consequently, the load current rises, during this time only.

These and other features and operation of the invention will be described in more detail below in connection with an embodiment thereof and with reference to the accompanying drawings.

BRIEF DESCRIPTION OF THE DRAWINGS

In the drawings.

Throughout the drawings, the same reference numerals are given to corresponding components.

DESCRIPTION OF THE PREFERRED EMBODIMENT

Figure 1:
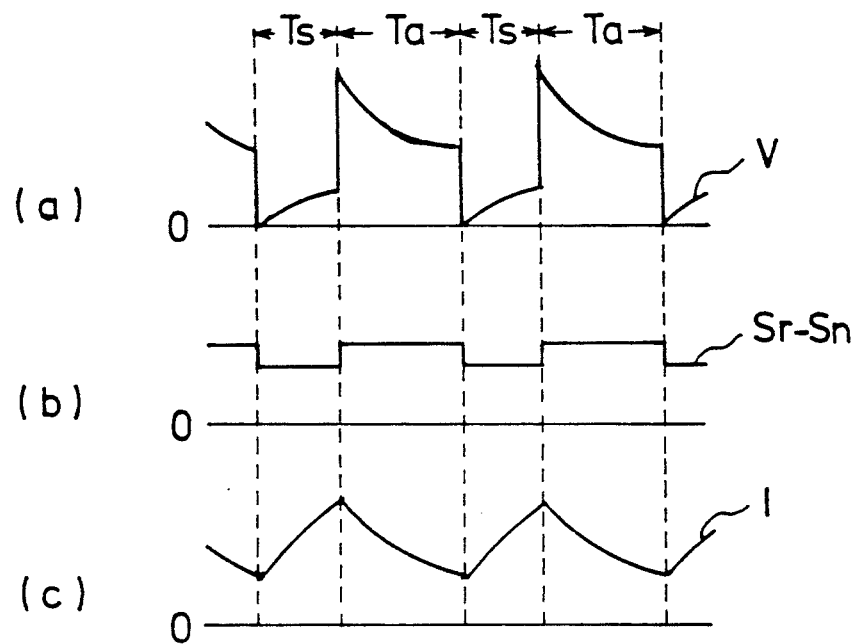
FIG. 1 how a set of voltage-current waveform diagrams for explaining the prior art.
Figure 2:
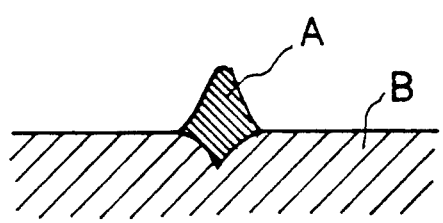
FIG. 2 is a sectional view showing undesirable weld according to the prior art.
Figure 3:
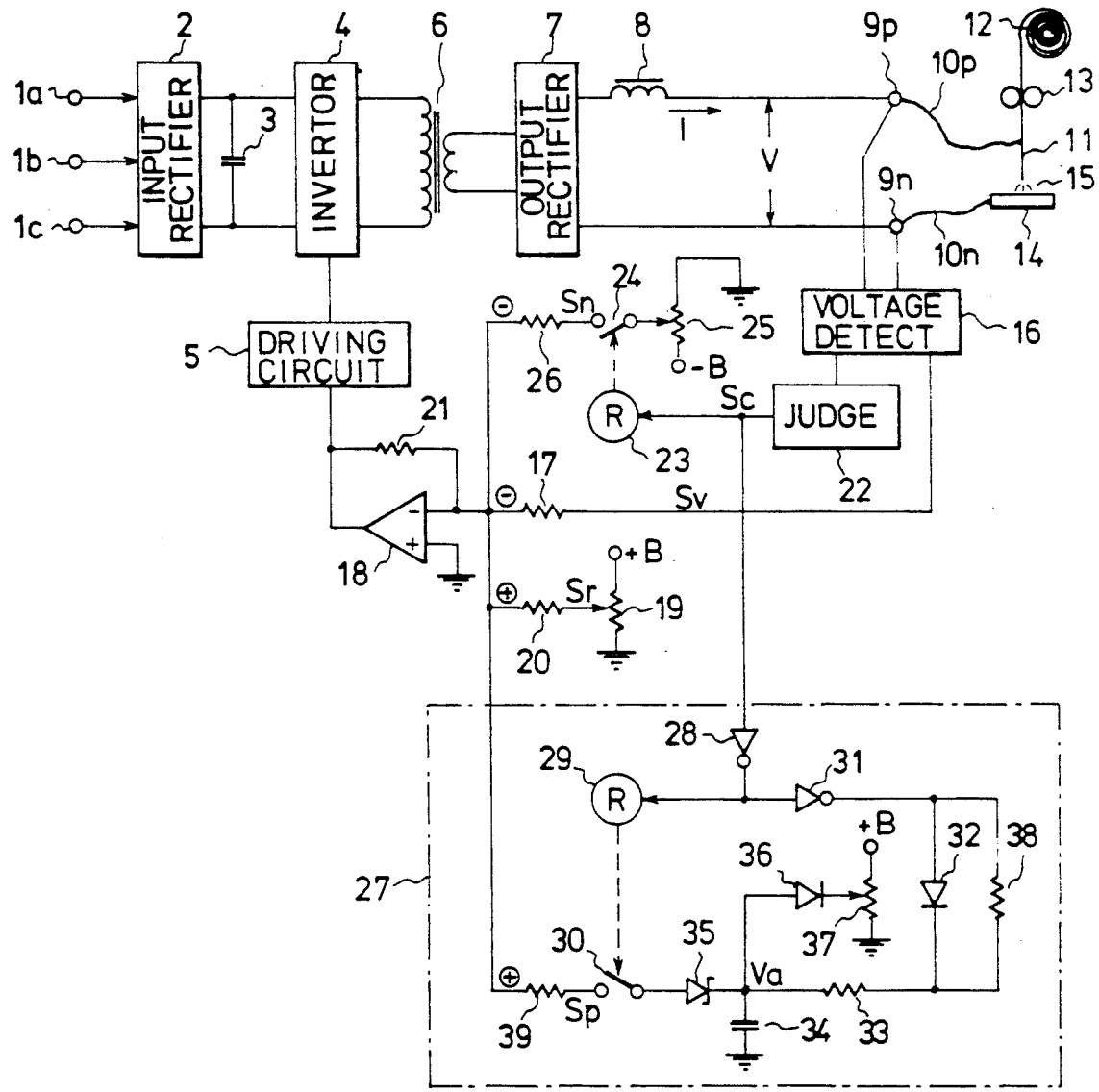
FIG. 3 is a schematic circuit diagram showing an invertor controlled d.c. arc welder of consumable electrode type including a preferred embodiment of this invention.

In the welder shown in FIG. 3, an a.c. power supplied from a commercial power supply of three-phase 200 volts a.c., for example, to input terminals 1a, 1b and 1c is rectified by an input rectifier 2 of diode bridge configuration, for example, smoothed by a smoothing capacitor 3 and supplied to an invertor 4. The invertor 4 is composed of a bridge circuit of semiconductor switching elements such as transistors and controlled by an invertor driving circuit 5 to effect high frequency switching operation, thereby producing a high frequency a.c. power. The high frequency power is appropriately reduced in voltage by an output transformer 6, then rectified by an output rectifier 7 of diode bridge configuration, for example, and delivered from positive and negative output terminals 9p and 9n through a smoothing and current limiting d.c. reactor 8. The positive output terminal 9p is connected through an insulated cable 10p to an electrode rod 11 which is continuously fed from a hoop 12 by a feeding mechanism 13 and the negative output terminal 9b is connected through an insulated cable 10n to a base material 14 to be welded. The electrode rod 11 and base material 14 form a welding load 15 which produces an arc therebetween.

Figure 4:
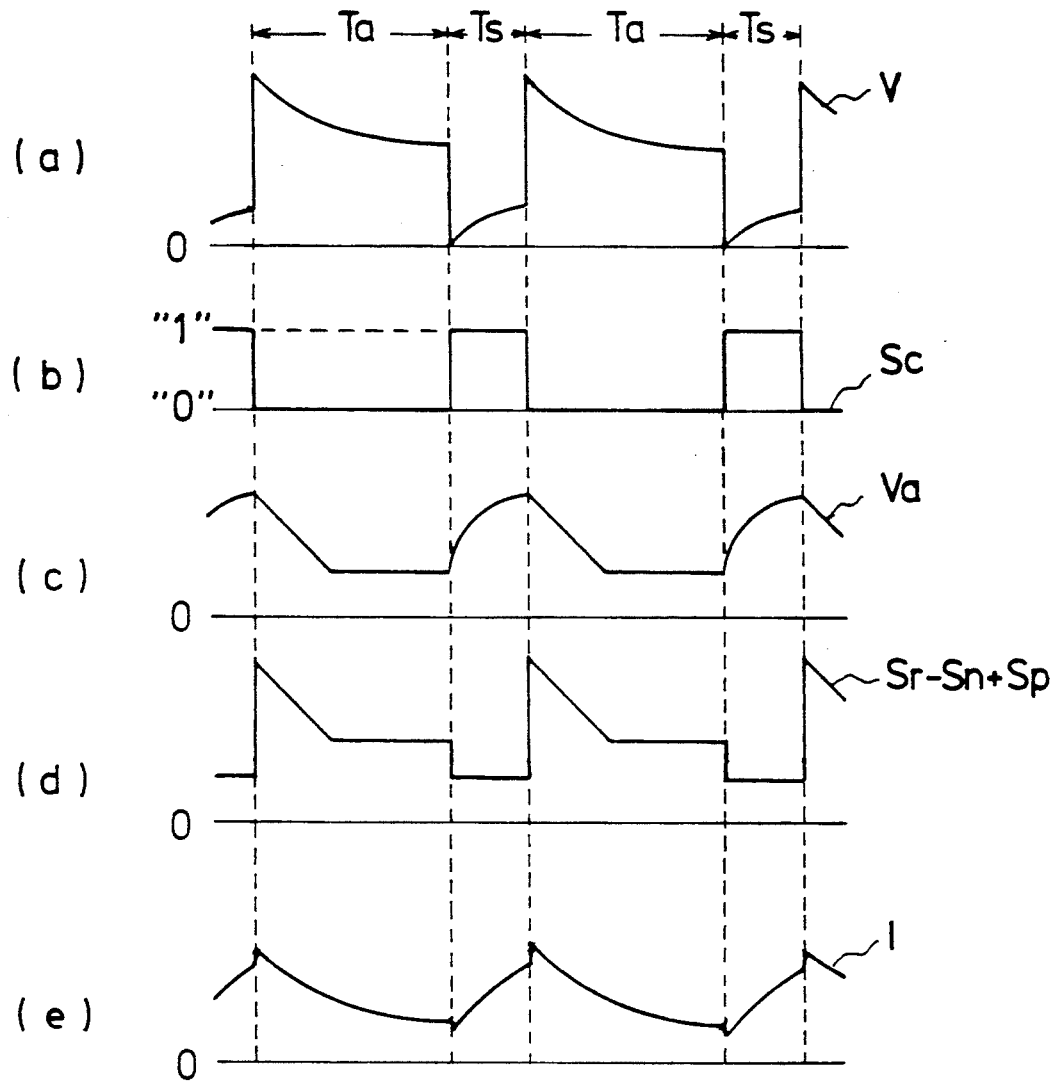
FIG. 4 shows another set of voltage-current waveform diagrams for explaining operation of the circuit of FIG. 3.

A voltage detector 16 detects an output voltage V between the output terminals 9p and 9n, which varies as shown in FIG. 4(a), and produces a corresponding detection signal Sv of a negative level. The detection signal Sv is supplied through a resistor 17 to an inversion input terminal of an operation amplifier 18 whose non-inversion input terminal is grounded. on the other hand, a reference signal Sr of a positive reference level preset by a level setting potentiometer 19 is also supplied through a resistor 20 of the same inversion input terminal of the operation amplifier 18. Accordingly, the output of the amplifier 18 indicates a level of a difference signal Sr-Sv and the driving circuit 5 receives this signal and controls the invertor so that its signal level tends to zero. Thus, the average value of the output voltage V is stabilized into a level specified by, the above-mentioned reference signal Sr.

The voltage detector 16 also applies a signal indicative of the output voltage V to a judge circuit 22. The judge circuit 22 may be a well-known one including a Zener diode, for example, and produces a discrimination signal Sc which becomes a high level "1" during the shorting period Ts and a low level "0" during the arcing period Ta as shown in FIG. 4(b). The signal Sc is applied to a relay circuit 23 and the circuit 23 responds to the high level of the signal Sc to close a switch 24 during the shorting period Ts. Thus, a correction signal Sn of a negative level preset by a level setting potentiometer 25 is supplied through the switch 24 and a resistor 26 to the inversion input terminal of the operation amplifier 18 and, therefore, the output level of the amplifier 18 is reduced by an amount corresponding to the signal Sn. Accordingly, the output voltage drops correspondingly to suppress generation of undesirable spattering during the shorting period.

Figure 5:
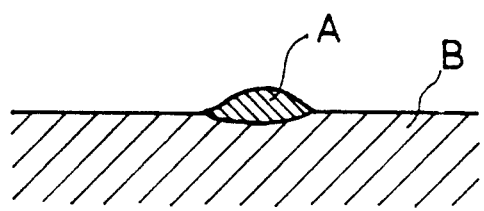
FIG. 5 is a sectional view showing an improved weld according to this invention.

In FIG. 3, a circuit enclosed with a phantom block 27 is the above-mentioned circuit according to this invention for preventing the load current drop during the arcing period. In the circuit 27, the discrimination signal Sc received through a NOT gate 28 is applied to a relay circuit 29 and the circuit 29 is responsive to the high level of its input to close a switch 30 during the arcing period. An inverted output of the NOT gate 28 is inverted again by another NOT gate 31 to become the discrimination signal Sc which is supplied through a diode 32 and a resistor 33 to a capacitor 34. The capacitor 34 is charged with the high level of the signal Sc during the shortening period and its terminal voltage Va rises integratedly as shown in FIG. 4(c) to exceed the Zener voltage of a Zener diode 35 and reach a voltage preset by a voltage clamping circuit composed of a diode 36 and a voltage setting potentiometer 37. Next, if the switch 30 is closed at an early time of the arcing period, the capacitor 34 starts to discharge and the voltage Va drops to the Zener voltage. As a resistor 38 is of a high impedance, the discharge is effected mainly through the switch 30 and a positive signal Sp corresponding to a portion of the waveform of FIG. 4(c) within the arcing period Ta is supplied through a resistor 39 to the inversion input terminal of the operation amplifier 18. Accordingly, the reference signal Sr becomes apparently as shown in FIG. 4(d) as a result of subtraction and addition of the correction signals Sn and Sp. Thus, the output voltage is raised at an early time of the arcing period to prevent insufficient output current I as shown in FIG. 4(e). Consequently, sufficient heat is supplied to a welded portion and a strong weld having a large welded area can be obtained as shown in FIG. 5.

The above embodiment is presented only for the purpose of illustrating this invention and does not mean any limitation of the invention. It should be obvious to those skilled in the art that various modifications and changes can be added to the embodiment within the spirit and scope of invention as defined in the appended claims. For example, this invention can be applied also to a welder including no spatter preventing means as occasion demands, though the above embodiment includes both of the prior art spatter preventing means using the correction signal Sn and the inventive current reduction preventing means using the correction signal Sp. While the charging and discharging waveform Va of the capacitor 34 in the correction circuit 27 is used as the correction signal Sp in the embodiment, any other waveform including a fixed potential may be used also. In this case, the correction circuit 27 can, of course, be suitably modified in correspondence thereto.

We claim:

1. In a d.c. arc welder of consumable electrode type comprising an input rectifier means for rectifying an a.c. supply power, and invertor means for converting an output on said rectifier means into a high frequency a.c. power, an output rectifier means for rectifying an output of said invertor means, means for supplying said output of said output rectifier means to a welding load, and feedback control means for detecting an output voltage of said output rectifier means and driving said invertor means based upon a difference in level between said output voltage and a predetermined reference voltage; the improvement comprising:

means for generating a gate signal when said output voltage of said output rectifier means is lower than a predetermined level, and correction means, responsive to presence and absence of said gate signal, for applying incremental correction to said reference voltage when said gate signal is absent.

2. An improvement to a d.c. arc welder as set forth in claim 1, said correction means comprising:

gate means for conducting a correction signal responsive to an inverted signal of said gate signal, means for accumulating a predetermined first level of voltage responsive to said gate signal, means for discharging a predetermined amount of said accumulated voltage, as said correction signal, through said gate means during said conducting, and means for adding said correction signal from said discharging means to said reference voltage.

3. In a d.c. arc welder of consumable electrode type comprising an input rectifier means for rectifying an a.c. supply power, and invertor means for converting an output on said rectifier means into a high frequency a.c. power, an output rectifier means for rectifying an output of said invertor means, means for supplying said output of said output rectifier means to a welding load, and feedback control means for detecting an output voltage of said output rectifier means and driving said invertor means based upon a difference in level between said output voltage and a predetermined reference voltage; the improvement comprising:

means for discriminating between a shorting period, when an electrode and a base material of said welding load are shorted together, and a period of arcing which occurs upon separation of said electrode from said shorting together with said base material;

means for providing and adding a correction level to said predetermined reference level, according to said discriminating, so as to cause said invertor means to increase said output voltage during an early portion of said arcing period;

whereby said increase in said output voltage in response to said correction level results in a corresponding output current which is sufficient to prevent low quality welds.

* * * * *